J. H. BUFORD.
FURROW CLEANER.
APPLICATION FILED MAY 6, 1919.

1,345,346.

Patented July 6, 1920.

INVENTOR
John H. Buford,

WITNESSES

BY

ATTORNEY

UNITED STATES PATENT OFFICE.

JOHN H. BUFORD, OF NEW HOPE, ALABAMA.

FURROW-CLEANER.

1,345,346. Specification of Letters Patent. Patented July 6, 1920.

Application filed May 6, 1919. Serial No. 295,200.

*To all whom it may concern:*

Be it known that I, JOHN H. BUFORD, a citizen of the United States, residing at New Hope, in the county of Madison and State of Alabama, have invented certain new and useful Improvements in Furrow-Cleaners, of which the following is a specification.

My invention relates to new and useful improvements in furrow cleaners, and more particularly to the type adapted to be carried by an agricultural machine and drawn through a furrow for cleaning or removing trash and obstructions therefrom.

An important object of the invention is to provide a device including a member tapering from its forward end, rearwardly, to facilitate the broadest portion of the device being arranged adjacent the ground. The device is also adapted to be inclined rearwardly with relation to the frame of the agricultural machine to which it is attached, in order that the cleaner may ride freely through the furrows to part and clean the same.

Another object of my invention is to provide a device of the above mentioned character which is provided with means upon both ends whereby the same may be readily attached or detached to any distributer, and which is strong, durable, inexpensive to manufacture, and efficient in practice.

Other objects and advantages will be apparent during the course of the following description.

Figure 1:
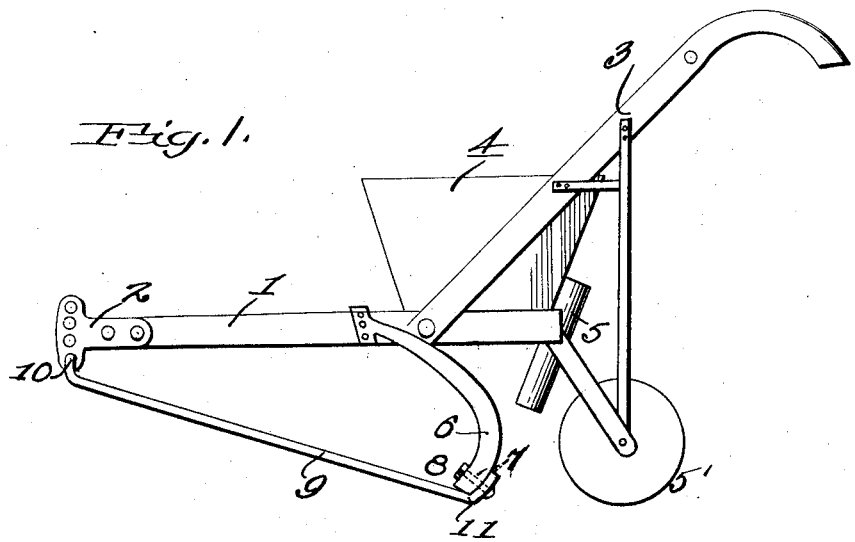
Figure 2:
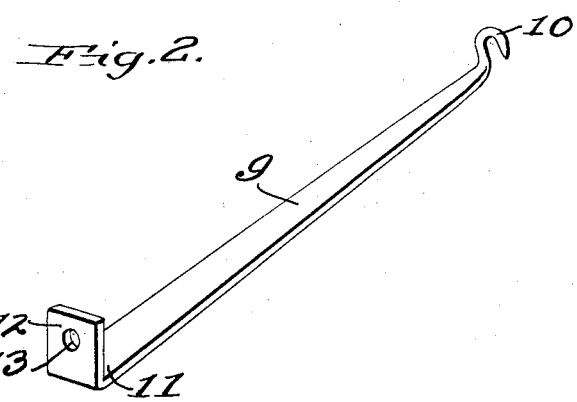

In the accompanying drawings forming a part of the description and wherein like numerals are employed to designate like parts throughout the same, Figure 1 is a side elevation of the invention attached to a distributer, and Fig. 2 is a perspective view of the invention.

In the drawings wherein for the purpose of illustration is shown a preferred embodiment of my invention, the numeral 1 designates the usual frame of a fertilizer distributer, having a bulk head 2 secured to the forward end of the frame, and having a plurality of openings therein; a guiding handle 3, the fertilizer hopper 4, and the fertilizer distributing tube 5, which has its upper end communicating with the hopper 4, and its lower portion projecting downwardly beyond the frame 1. The numeral 5' indicates the harrow disk arranged in rear of the distributing tube, and is adapted to follow in the furrow made by the plow. The lowermost end of the plow foot piece 6 is provided with an opening therethrough, and said opening is adapted to receive a bolt 7 and nut 8, for securing the usual plow (not shown) to the distributing tube. However, when my invention is applied to the distributer, the plow is removed therefrom, in order that the lower end of my invention may be secured to the distributer in the same manner.

My invention consists of an elongated bar 9 which is substantially flat, transversely, when applied to a distributer. It is to be understood that the length of the bar may vary, according to the distributer to which it is attached. The forward end of this bar is reduced and rounded into a point, and is then bent at right angles to the flat portion of the bar, then transversely of the bar and downwardly to form a hook 10. From this hook 10 the bar 9 gradually increases in its width to its opposite end 11. This flat end is bent upwardly in the same direction as the hook to form an angular portion 12 which is provided with an aperture 13. The angle to which this angular portion 12 is bent, varies, as does the length of the bar when used with different fertilizers of various lengths.

The hooked end of the bar is inserted through one of the openings in the bulk head 2, and the angular portion of the bar is arranged in rear of the foot piece to snugly engage the same after the bolt has been inserted through the opening 13 and the opening in the foot piece 6, and the nut 8 screwed down upon the bolt 7 to draw the angular portion 12 into close engagement with said foot piece 6. By the formation of this bar, and connecting it in the manner set forth, it will be noted that the bar takes the inclined position in relation to the frame 1. This inclination is downwardly from the forward end of the distributer.

Before the device is used to its greatest advantage, it is necessary to plow the earth into furrows. The distributer is then drawn by any power, and guided so that the bar 9 will be received in the furrow. As the distributer is drawn along, the bar 9 by its tapering and flat formation will part the earth on both sides of the outlet end of the distributing tube 5 so as to allow the free passage of the fertilizer from the tube. Usually trash and large lumps of earth are experienced in the furrow, and as the distributer is drawn therethrough, the refuse and twigs collect upon the foot piece and interfere with and clog up the outlet end of tube 5. Too much emphasis cannot be put on the inclined relation of the bar to the frame, the tapering formation of the bar, and the flat surface embodied thereby. It is also to be noted that the free end of the hook 10 extends to one side of this bar.

It is to be understood that the form of my invention herewith shown and described is to be taken as a preferred example of the same, and that various changes in the shape, size and arrangement of parts may be resorted to, without departing from the spirit of the invention or the scope of the sub-joined claim.

Having described my invention, I claim:—

A furrow cleaner for material distributers comprising a frame having a depending standard, a tapered inclined bar adapted to ride through the furrow, a hook on the front end of said bar for attachment with the frame, and an upwardly extending portion on the opposite end of the bar for attachment with said standard.

In testimony whereof I affix my signature in presence of two witnesses.

JOHN H. BUFORD.

Witnesses:
W. THOMAS,
A. H. SMITH.